United States Patent
Lin

[19]

[11] Patent Number: 5,989,117
[45] Date of Patent: Nov. 23, 1999

[54] SHELLFISH WASH DEVICE

[76] Inventor: Kuei-Chou Lin, 58, Ma Yuan West St., Taichung, Taiwan

[21] Appl. No.: 09/108,362

[22] Filed: Jul. 1, 1998

[51] Int. Cl.$^6$ .............................. A22B 7/00; A22C 29/04
[52] U.S. Cl. ............................................. 452/173; 452/12
[58] Field of Search ................................ 452/173, 1, 12; D32/1, 6, 13; 68/12.01, 23.6, 23.7, 23 R, 133

[56] References Cited

U.S. PATENT DOCUMENTS

| | | | |
|---|---|---|---|
| 112,603 | 3/1871 | King | 74/42 |
| 1,580,778 | 4/1926 | Coverstone | 68/133 |
| 1,705,779 | 3/1929 | Nelson | 68/23 R |
| 1,756,318 | 4/1930 | Voss | 68/133 |
| 2,107,139 | 2/1938 | Blandford | 248/146 |
| 2,192,317 | 3/1940 | Kellerman | 68/22 A |
| 2,298,624 | 10/1942 | Labisky | 68/4 |
| 2,498,544 | 2/1950 | Gerhardt | 210/382 |
| 2,498,734 | 2/1950 | Bozanich | 68/148 |
| 2,506,280 | 5/1950 | Ryder | 68/10 |
| 2,563,046 | 8/1951 | Killin | 68/23 R |
| 2,659,226 | 11/1953 | Pellerin | 68/133 |
| 3,089,327 | 5/1963 | Stilwell, Jr. | 68/139 |
| 3,233,436 | 2/1966 | Gibson | 68/133 |
| 4,324,020 | 4/1982 | Garwin et al. | 452/12 |
| 4,538,327 | 9/1985 | Einarsson | 452/12 |
| 4,711,104 | 12/1987 | Ikeda | 68/23 R |
| 5,680,779 | 10/1997 | Na | 68/133 |
| 5,823,019 | 10/1998 | Park | 68/133 |

FOREIGN PATENT DOCUMENTS

| | | | |
|---|---|---|---|
| 587335 | 11/1959 | Canada | 452/173 |
| 580238 | 1/1994 | European Pat. Off. | 452/12 |
| 94544 | 8/1969 | France | 452/173 |
| 404131039A | 5/1992 | Japan | 452/12 |
| 407123884A | 5/1995 | Japan . | |
| 90725 | 1/1958 | Norway | 452/1 |
| 646973 | 2/1979 | U.S.S.R. | 452/173 |
| 665881 | 6/1979 | U.S.S.R. | 452/12 |
| 886875 | 12/1981 | U.S.S.R. | 452/173 |

OTHER PUBLICATIONS

Field and Stream, comic, p. 16, May 1950.

*Primary Examiner*—Thomas Price
*Assistant Examiner*—Fredrick T. French, III

[57] ABSTRACT

A shellfish wash device has a main platform, a wash tank disposed on the main platform, a tubular flow device disposed in the wash tank, a power source disposed beneath the wash tank, a main disk disposed in the tubular flow device, and a rotating cap disposed on the main disk. The power source has a motor, a first bevel gear, a pivot connected to the motor and the first bevel gear, a second bevel gear engaging with the first bevel gear, a shaft connected to the second bevel gear, and a distal portion of the shaft passing through a center of the wash tank, a center of the tubular flow device and a center of the main disk. An end of the shaft is inserted in the rotating cap.

1 Claim, 5 Drawing Sheets

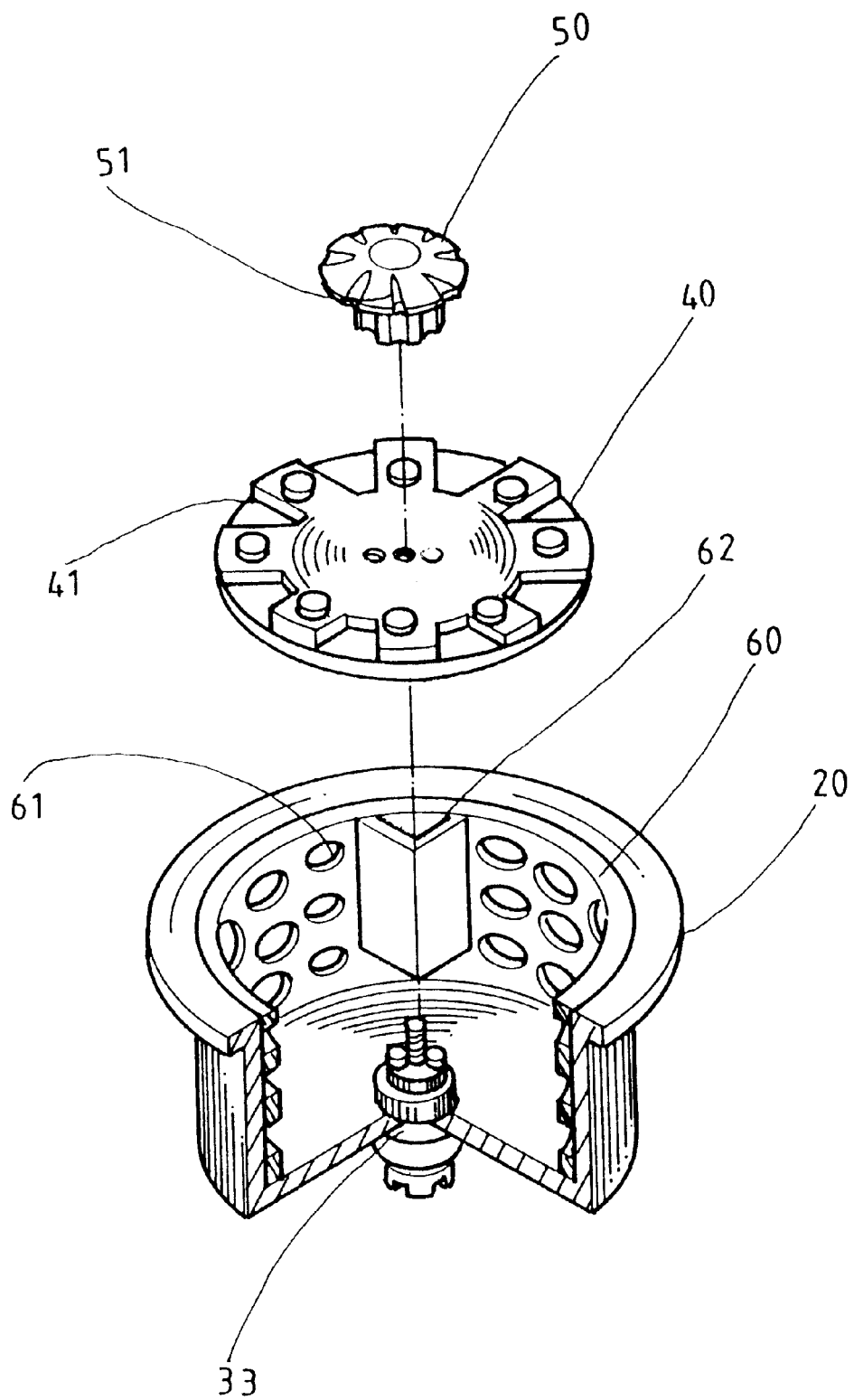
F I G. 3

SHELLFISH WASH DEVICE

BACKGROUND OF THE INVENTION

The present invention relates to a shellfish wash device. More particularly, the present invention relates to a shellfish wash device which can wash shellfish quickly.

A conventional shellfish wash device is a basin. An acidic solution is often used for cleaning the shells. However, the residual acidic solution may remain on the shells. Furthermore, the user should wash the shells manually. Therefore, the hands of the user may be damaged by the acidic solution.

SUMMARY OF THE INVENTION

An object of the present invention is to provide a shellfish wash device which can wash shellfish quickly.

Accordingly, a shellfish wash device comprises a main platform, a wash tank disposed on the main platform, a tubular flow device disposed in the wash tank, a power source disposed beneath the wash tank, a main disk disposed in the tubular flow device, and a rotating cap disposed on the main disk. The power source comprises a motor, a first bevel gear, a pivot connected to the motor and the first bevel gear, a second bevel gear engaging with the first bevel gear, a shaft connected to the second bevel gear, and a distal portion of the shaft passing through a center of the wash tank, a center of the tubular flow device and a center of the main disk. An end of the shaft is inserted in the rotating cap. The motor drives the pivot to rotate. The pivot drives the first bevel gear to rotate. The first bevel gear drives the second bevel gear and the shaft to rotate. The shaft drives the main disk and the rotating cap to rotate.

BRIEF DESCRIPTION OF THE DRAWINGS

FIG. 3 is a perspective exploded view of a wash tank, a main disk, and a rotating cap;

DETAILED DESCRIPTION OF THE INVENTION

Figure 1:
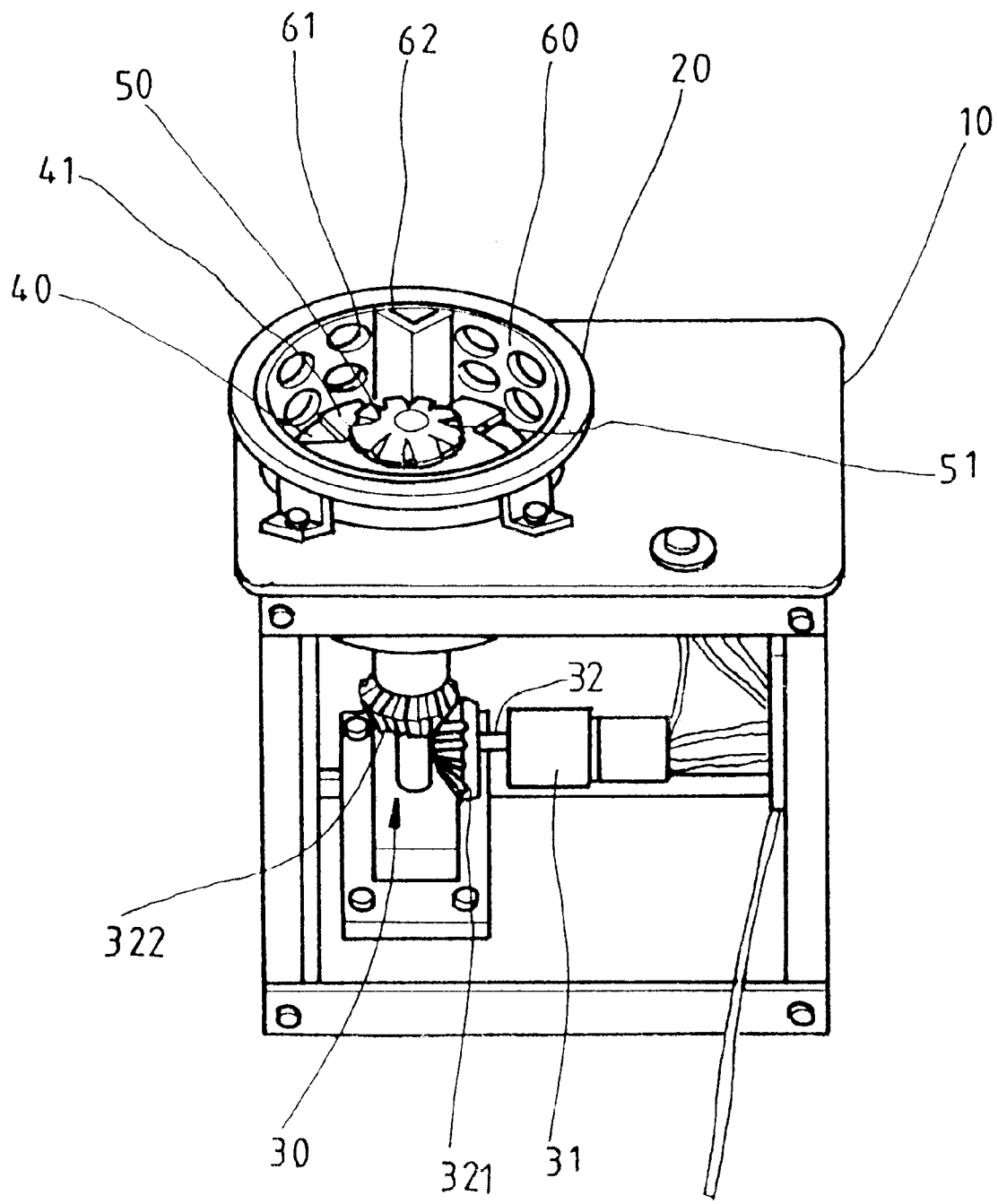
FIG. 1 is a perspective view of a shellfish wash device of a preferred embodiment in accordance with the present invention.
Figure 2:
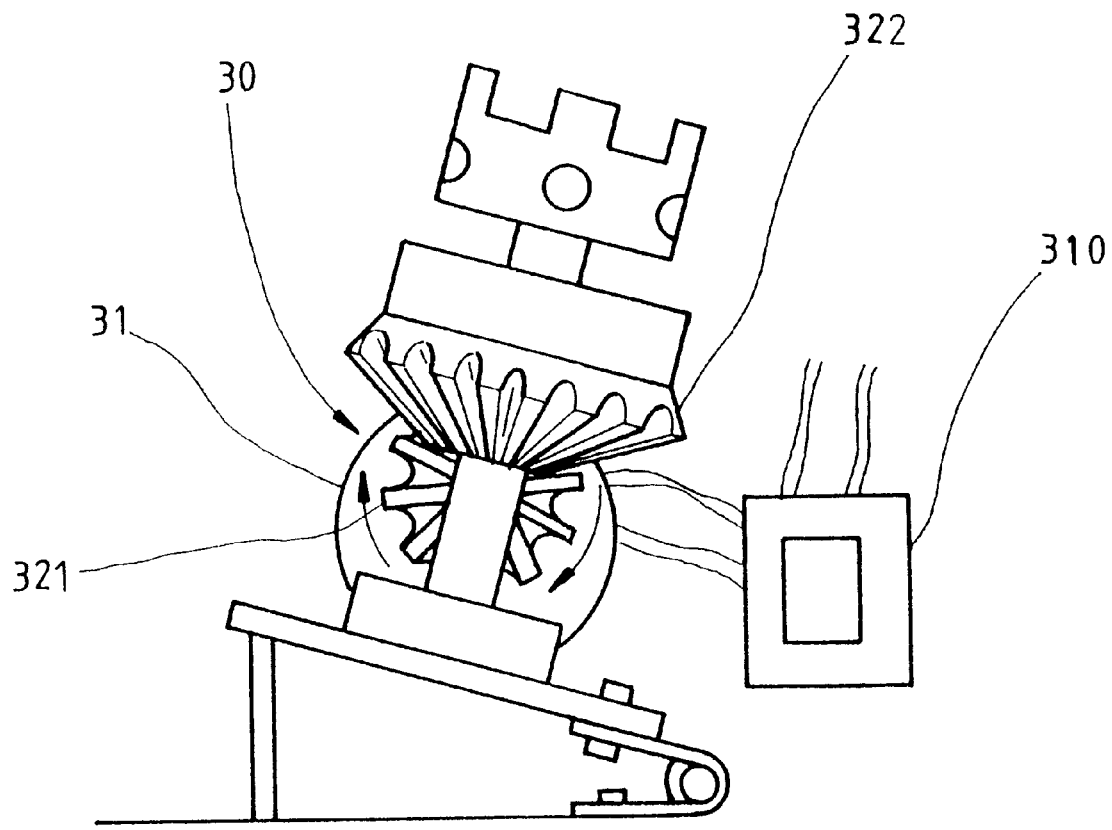
FIG. 2 is a schematic view of a power source.
Figure 4:
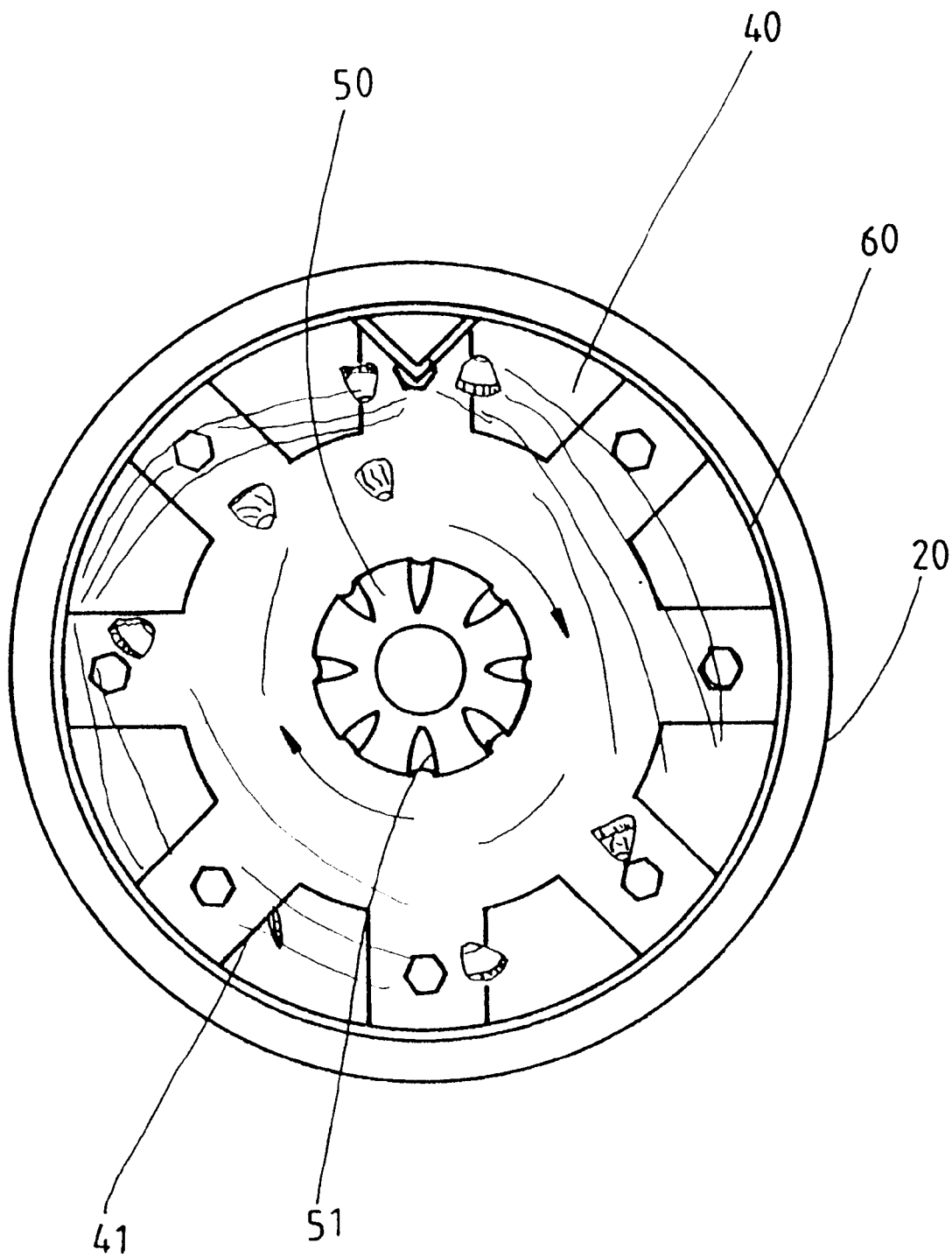
FIG. 4 is a schematic view illustrating an operation of a wash tank.
Figure 5:
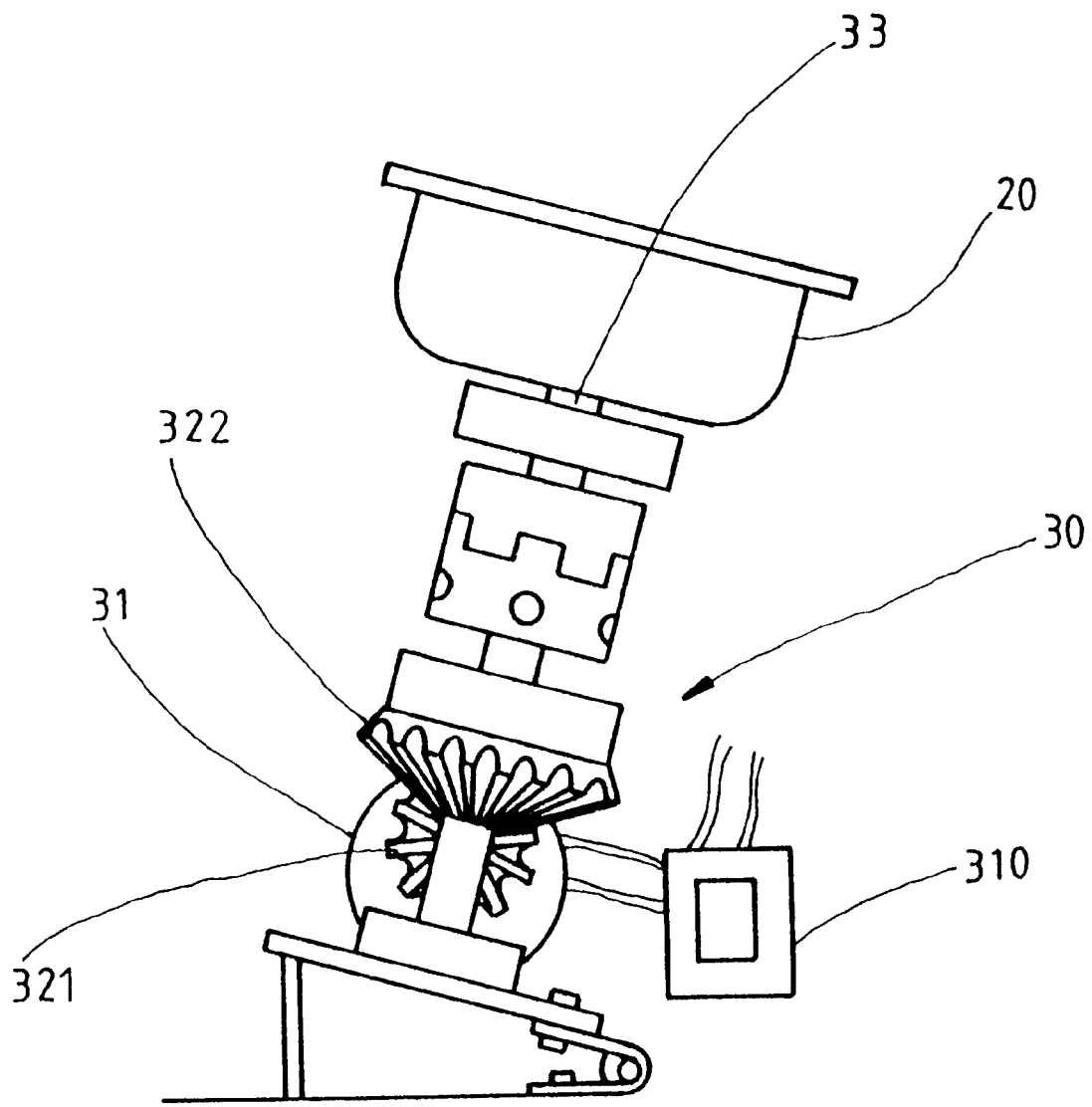
FIG. 5 is a schematic view of a shellfish wash device of a preferred embodiment in accordance with the present invention.

Referring to FIGS. 1 to 5, a shellfish wash device comprises a main platform 10, a wash tank 20 disposed on the main platform 10, a tubular flow device 60 disposed in the wash tank 20, a power source 30 disposed beneath the wash tank 20, a main disk 40 disposed in the tubular flow device 60, and a rotating cap 50 disposed on the main disk 40.

The power source 30 comprises a motor 31, a first bevel gear 321, a pivot 32 connected to the motor 31 and the first bevel gear 321, a second bevel gear 322 engaging with the first bevel gear 321, a shaft 33 connected to the second bevel gear 322, and a distal portion of the shaft 33 passing through a center of the wash tank 20, a center of the tubular flow device 60 and a center of the main disk 40. An end of the shaft 33 is inserted in the rotating cap 50. A switch 310 controls the motor 31 via wires.

The motor 31 drives the pivot 32 to rotate. The pivot 32 drives the first bevel gear 321 to rotate. The first bevel gear 321 drives the second bevel gear 322 and the shaft 33 to rotate. The shaft 33 drives the main disk 40 and the rotating cap 50 to rotate.

The rotating cap 50 comprises a plurality of periphery recesses 51.

The main disk 40 comprises a plurality of periphery grooves 41.

The tubular flow device 60 comprises at least a periphery angle plate 62 and a plurality of periphery holes 61.

After water and the shellfishes are placed in the tubular flow device 60, the switch 310 can be turned on. When the main disk 40 and the rotating cap 50 are rotated, the main disk 40 and the rotating cap 50 drive the water to produce vortex flow and turbulent flow. Therefore, the shellfishes can be washed easily and quickly.

The present invention is not limited to the above embodiment but various modification thereof may be made. Furthermore, various changes in form and detail may be made without departing from the scope of the present invention.

I claim:

1. A shellfish wash device comprises:

a main platform, a wash tank disposed on the main platform, a tubular flow device disposed in the wash tank, a power source disposed beneath the wash tank, a main disk disposed in the tubular flow device, a rotating cap disposed on the main disk, the power source comprising a motor, a first bevel gear, a rotating pivot connected to the motor and the first bevel gear, a second bevel gear engaging with the first bevel gear, a shaft connected to the second bevel gear, and a distal portion of the shaft passing through a center of the wash tank, a center of the tubular flow device and a center of the main disk, an end of the shaft inserted in the rotating cap, the rotating cap comprising a plurality of periphery recesses, the main disk comprising a plurality of periphery grooves, the tubular flow device comprising at least a periphery angle plate and a plurality of periphery holes, wherein the motor drives the rotating pivot to rotate, the rotating pivot drives the first bevel gear to rotate, the first bevel gear drives the second bevel gear and the shaft to rotate, an d the shaft drives the main disk and the rotating cap to rotate.

\* \* \* \* \*